United States Patent [19]
Kelley et al.

[11] Patent Number: 6,043,843
[45] Date of Patent: Mar. 28, 2000

[54] COMPUTERIZED CONTROL OF MULTI-SIZE SPOT BEAM IMAGING

[75] Inventors: Henry A. Kelley, Woburn; Steven E. Mason, North Andover, both of Mass.

[73] Assignee: Agfa Corporation, Wilmington, Mass.

[21] Appl. No.: 09/169,958

[22] Filed: Oct. 13, 1998

Related U.S. Application Data

[62] Division of application No. 08/851,800, May 6, 1997, Pat. No. 5,923,473.

[51] Int. Cl.[7] ................................................ H04N 5/225
[52] U.S. Cl. ............................................ 348/335; 348/207
[58] Field of Search ................................ 348/207, 335, 348/340, 343, 344, 345, 358, 369; 358/300; 347/253, 246; 359/618, 823, 626, 641; 353/28; H04N 5/225

[56] References Cited

U.S. PATENT DOCUMENTS

| | | | |
|---|---|---|---|
| 4,097,881 | 6/1978 | Katagiri | 396/141 |
| 4,803,497 | 2/1989 | Kennedy et al. | 347/253 |
| 5,745,296 | 4/1998 | Nakamura et al. | 359/641 |

*Primary Examiner*—Tuan Ho
*Attorney, Agent, or Firm*—Alfred A. Stadnicki; Edward L. Kelley

[57] ABSTRACT

A system for forming optical beam spots of different sizes on an imaging surface, includes an emitter configured to emit an optical beam along a path. The optical beam is focused at a first focus point and impinges upon the imaging surface downstream of the first focus point. A lens, having a single fixed magnification other than one, is located between the first focus point and the imaging surface so as to be in the optical path of the optical beam. The lens is moveable between a first position located a first distance from the first focus point and a second distance from a second focus point of the optical beam which is downstream of the lens and a second position located the second distance from the first focus point and the first distance from the second focus point. With the lens at the first position the optical beam forms a beam spot of a first size on the imaging surface and with the lens at the second position the optical beam forms a beam spot of a second size, which is different than the first beam size, on the imaging surface.

11 Claims, 12 Drawing Sheets

COMPUTERIZED CONTROL OF MULTI-SIZE SPOT BEAM IMAGING

This application is a division of application Ser. No. 08/851,800 filed on May 6, 1997, U.S. Pat. No. 5,923,473.

TECHNICAL FIELD

The present invention relates to optical imaging and more particularly to multi-size spot beam imaging.

BACKGROUND ART

Modern imagesetters and platesetters utilize optical scanners to write or record images for subsequent reproduction or to read a prerecorded image at a predefined resolution rate. Such scanners may write or record images on or read prerecorded images from various media including photo or thermal sensitive paper or polymer films, photo or thermal sensitive coatings or erasable imaging materials, an aluminum or other metal base printing plate, or other type media. The medium is typically mounted on an imaging surface which may be planar or curved and then scanned with an optical beam.

The primary components of modern imagesetting and platesetting systems include an image processor to generate and/or edit an image, a raster image processor (RIP) for converting data signals from the image processor into signals which can be understood by a controller which controls the scanning of the optical beam by the imagesetter or platesetter. The imagesetter or platesetter itself typically includes a scan assembly which is often disposed and movable within a drum cylinder in which the recording or recorded medium is mounted. The controller, in accordance with the signals from the RIP and its own programmed instructions, generates signals to control the optical scanning so as to write images on or read images from the medium mounted within the drum cylinder by scanning one or more optical beams over the inside circumference of the drum cylinder while the cylinder itself remains fixed. A typical scan assembly of a cylindrical drum type imager system may include a spin mirror or other optical device to direct the light beam over the inside circumference of the drum cylinder, as will be well understood by one skilled in the art.

Because imagesetting and platesetting systems are often used to record or read different quality images, modern systems are typically designed to allow the recording or reading of images at various imaging resolutions or what is often referred to as different system addressabilities. The imagesetting or platesetting system may be designed to record at any one of multiple resolutions such as 1200 dots per inch (dpi), 1800 dpi, 2400 dpi or 3600 dpi depending on the desired quality of the recording. For example, media recorded with graphics and text for use in printing newspapers may be recorded at a relatively low resolution whereas media recorded with graphics which will subsequently be printed in a high quality photographic publication will typically require a relatively high resolution.

Hence, imagesetting and platesetting systems, as well as other optical imaging systems, often need to be capable of operating at multiple resolutions. In optical scanning devices, such as imagesetters and platesetters, the scanning spot size is typically changed to match, at least approximately, the scan line spacing changes required at different system addressabilities and hence different imaging resolutions. A number of techniques have been proposed to vary the optical beam spot size in imagesetting and platesetting system implementations to allow selectability of different system addressabilities.

For example, it is well known to use different size apertures or apodization of the beam to change the beam spot size to correspond with a selected addressability. Systems utilizing this technique may include an aperture disk having multiple apertures so that the disk can be rotated to place the aperture corresponding to a selected addressability in the path of the optical beam and thereby control the beam spot size impinging upon the medium being imaged to provide the desired resolution. The use of an aperture disk provides a relatively uncomplex and inexpensive means for changing the optical beam spot size on the imaged medium to correspond with a selected system addressability. Furthermore, the use of an aperture disk does not contribute significantly to beam misalignment and/or geometric errors within the system. However, the use of apertures to establish different beam spot sizes can result in a significant reduction in the energy available at the imaging surface whenever the beam spot size impinging on the imaging surface is enlarged.

Continuous focus zoom or telescoping lens arrangements have also been proposed to modify the beam spot size impinging on the imaging surface to correspond with a selected system addressability. Zoom lens arrangements have the advantage of continuous resolution adjustment. Zoom lenses, however, are generally considered to be complex. Zoom lens arrangements typically require that the focus and beam alignment be closely controlled and that, in at least some scanning architectures, geometric errors in the scan line be closely monitored. In practice the complexities and costs of using zoom lenses has generally been considered to outweigh the advantage of continuous adjustment.

Telescoping lenses typically require additional optics for collimating and/or focusing the beam. Typically different sets of additional optical elements will be required dependent upon whether the telescoping lens is in a retracted or extended position, thereby even further increasing the number of optical elements required for a practical implementation. Incorporation of this technique within commercial imaging systems is expensive and requires complex adjustments particularly in high resolution scanning implementations.

OBJECTIVES OF THE INVENTION

Accordingly it is an object of the present invention to form optical beam spots having different sizes and substantially equal power on an imaging surface.

It is an object of the present invention to form optical beam spots having different spot sizes, each corresponding to a predefined addressability, on an imaging surface.

It is a further object of the present invention to form optical beam spots of different sizes and high optical efficiency without resorting to increased beam truncation on an imaging surface.

A yet additional object of the present invention is to provide a system for forming optical beam spots of different sizes on an imaging surface, which is easily constructed, aligned and focussed.

A still further object of the present invention is to provide a system for forming optical beam spots of different sizes on an imaging surface with a minimum number of optical components.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, such as photography, which are within the scope of the invention as disclosed and claimed herein and with respect to which the invention could be of significant utility.

SUMMARY DISCLOSURE OF THE INVENTION

In accordance with the present invention, an imaging system for forming optical spot beams of different sizes on an imaging surface, whether planar or curved, includes an emitter which emits an optical beam along a path which impinges upon the imaging surface downstream of a first beam focus or focal point. The first focus point could be at a beam generating laser source point, at an optical fiber end from which an optical beam is emitted, at an object being imaged or at some other focal point along the beam path. A lens or lens assembly, having a single fixed magnification other than one, is located in the optical path of the optical beam between the first focus point and the imaging surface. The lens is moveable between first and second positions. The first position is located a defined first distance downstream from the first focus point and a defined second distance from a second focus point, which may be the imaging surface or another focal point along the optical beam path, which is downstream of the lens. The second position is located the defined second distance from the first focus point and the defined first distance from the second focus point. With the lens at the first position, the optical beam forms a beam spot of a first size on the imaging surface, whereas with the lens at the second position the optical beam forms a beam spot of a second size, which is different than the first size, on the imaging surface. Preferably, the lens moves along its optical axis between the first and second positions. For example, the lens may be driven to slide along a guide bar, may be mounted on rollers or wheels and driven along a track. The lens may also or alternatively be manually moveable from the first position to the second and visa versa. In fact, the lens may be moved in any desired manner or using any suitable drive mechanism between the first and second positions.

In a single moveable lens configuration, the system can facilitate two system addressabilities. More particularly, the lens position is used to set one of the spot sizes to correspond to one desired imaging resolution and the other spot size to correspond to another desired imaging resolution such that high quality imaging can be performed at dual resolutions without the need for multiple apertures or zoom lens. In accordance with one exemplary implementation of the invention, the lens can be positioned as indicated above with the first distance being substantially equal to the effective focal length of the lens multiplied by 1.707 and the second distance being substantially equal to the effective focal length of the lens multiplied by 2.414; creating a two-to-one change in the spot size between the two positions. It will be recognized by those skilled in the art that the multipliers will vary depending upon the desired resolution ratios. For example, the specific multipliers mentioned above relate to a magnification change of two as is further described below.

The system preferably includes an input device, such as a keypad, mouse, dial or other manual or voice activated input device, configured to receive operator inputs to change the addressability of the system from one imaging resolution to another imaging resolution. The system also beneficially includes a controller configured to control the lens movement from one of its two operating positions to the other, responsive to the operator inputs to thereby change the beam spot size so as to correspond with the selected addressability.

Closed loop monitoring and adjustment may be provided by incorporating within the system, a sensor configured to detect the location of the beam spot on the imaging surface before and after the beam spot size changes. As will be recognized by those skilled in the art, it is normally desirable that the beam positioning on the imaging surface remain the same notwithstanding the change in beam size. Accordingly, if the detected positions of the beam spot before and after the beam spot size changes are not aligned, the controller is further configured to control the lens movement in a direction substantially perpendicular to its optical axis, e.g. in a horizontal and/or vertical direction or a direction having a horizontal and vertical component, to correct the misalignment. It will be understood that depending upon the implementation, perfect positional alignment may not be necessary and therefore misalignment should be understood to mean that the alignment is outside the alignment threshold necessary to obtain the desired imaging results. In this way, the position of the beam spot on the imaging surface after the beam spot size changes can be aligned with the position of the detected beam spot on the imaging surface before the beam spot size was changed.

If more than two addressabilities are required, additional lenses or lens assemblies can be utilized. For example, for four addressabilities, a second lens is added. The second lens has a single fixed magnification other than one and is located in the optical path of the optical beam downstream of the second focus point. The second lens is moveable between third and fourth positions. The third position is located a third distance downstream from the second focus point and a fourth distance from a third focus point of the optical beam which is downstream of the second lens. The fourth position is located the fourth distance from the second focus point and the third distance from the third focus point. The third focus may be the imaging surface or another focal point of the optical beam downstream of the second lens. The controller is adapted to control the movement of both lenses in a multi-lens system.

With the first lens at the first position and the second lens at the third position the optical beam forms a beam spot of the first size on the imaging surface. The first-beam spot advantageously corresponds to a particular addressability and hence a particular resolution, e.g. 1200 dpi. With the first lens at the second position and the second lens at the third position the optical beam forms a beam spot of the second size on the imaging surface. The second beam spot corresponds to a different addressability and resolution, e.g. 1800 dpi. With the first lens at the first position and the second lens at the fourth position the optical beam forms a beam spot of a third size on the imaging surface. The third beam spot corresponds to still another addressability and resolution, e.g. 2400 dpi. With the first lens at the second position and the second lens at the fourth position the optical beam forms a beam spot of a fourth size on the imaging surface. The fourth beam spot corresponds to yet another addressability and resolution, e.g. 3600 dpi. As will be recognized, by adding additional moveable lenses or lens assemblies, additional beam sizes can be formed on the imaging surface and according additional imaging resolutions obtained.

In the case of a multi-lens system, if the detected positions of the beam spot before and after the beam spot size changes are misaligned, the controller is adapted to control the movement of one or more of the lenses substantially perpendicular to its optical axis, to thereby align the position of the beam spot on the imaging surface after the beam spot size changes with the detected position of the beam spot on the imaging surface before the beam spot size change. In this regard, one lens can be controlled to move horizontally while another lens is controlled to move vertically. Alternatively, only one lens may be moved substantially perpendicular to its optical axis to correct the misalignment and accordingly the direction of movement may have both a horizontal and vertical component.

The multiple lenses may have the same or different effective focal lengths. In the dual lens system discussed above, the third distance can be substantially equal to the effective focal length multiplied by 1.707 and the fourth distance can be substantially equal to the second effective focal length multiplied by 2.414. However, as will be understood from the detailed description presented below, this is not necessarily the case, and the multiplier could change from lens to lens depending upon the desired imaging resolutions, i.e., system addressabilities.

In accordance with other aspects of the invention, computer programming is provided for forming optical beam spots of different sizes on an imaging surface. The computer programming is stored on a computer readable storage medium. The stored computer programming is configured to be readable from the computer readable storage medium by a computer and thereby cause the computer to operate so as to process an operator input signal to identify a selected resolution. The computer is then instructed by the programming to generate a signal representing the identified resolution and, for example, to display the selected resolution on a system monitor. The processor is also programmed to generate a signal to direct the movement of a lens of the type described above to a first position or second position corresponding to the selected resolution. The first position is located a first distance from a first optical beam focus point which is upstream of the lens and a second distance from a second optical beam focus point which is downstream of the lens. Locating the lens at the first location will result in the formation of a beam spot of a first size on the imaging surface. The second position is located the second distance from the first focus point and the first distance from the second focus point. Locating the lens at the second position results in the formation a beam spot of a second size, which is different than the first spot size, on the imaging surface.

The computer is also beneficially programmed to process signals representing positions of the beam spot on the imaging surface before and after moving the lens to identify any misalignment. If a misalignment is identified, the computer is programmed to generate a signal to direct the movement of the lens in a direction substantially perpendicular to an optical axis of the lens and thereby correct the identified misalignment. In a multi-lens system, the computer may also be instructed by the programming to direct movement of a second lens as discussed above.

BEST MODE FOR CARRYING OUT THE INVENTION

Figure 1:
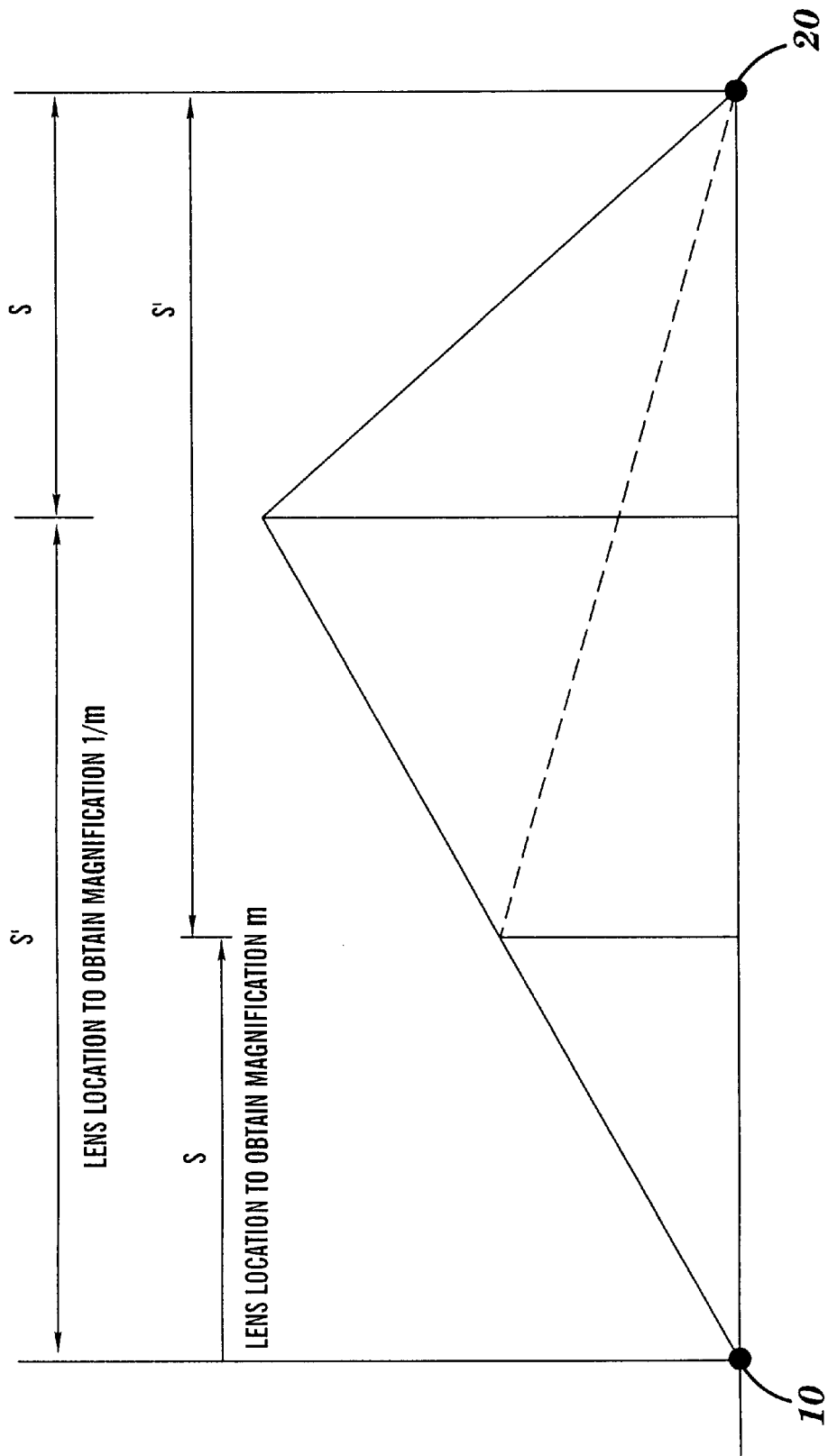
FIG. 1 generally depicts the use of a single moveable lens to obtain alternative imaging resolutions on an imaging surface in accordance with the present invention.

A simple lens formula defines the total length between a first focus point upstream of a thin lens and a second focus point downstream of the thin lens. The first focus point may be a focal point at a light generator, such as a laser diode, at a light emitter, such as the end of an optical fiber, at an optical device, such as an AOM, at an object which is to be imaged, or at any focal point along the path of an optical beam. The second focus point may be any focal point along the beams optical path or an imaging surface, whether planar or curved. The formula has two solutions for the distance between the first focus point and the lens to obtain a magnification at the second focus point for each fixed combination of the effective focal length of the lens and total length between the first and second fixed focus points. More particularly, at one of the distances, the lens will produce one magnification and at the other of the distances, the lens will produce another magnification which is the reciprocal of the first magnification if the total length between the focus points is maintained.

Real lenses, such as thick lenses or complex lens assemblies, can be considered to behave in substantially the same fashion as a thin lens if a calculable missing distance is added to or subtracted from the actual total distance between the focus points in both solutions as will be well understood by one skilled in the art. Lens aberrations can change the distance from the first focus point to the lens which is actually required to obtain the best focus and magnification from the distance theoretically required to obtain the best focus and magnification of a simple lens or real lens based upon the solution of the thin lens formula. However, from a practical standpoint, the difference between the focus and magnification obtained at the distance which is actually, rather than theoretically, the best lens location is typically small and can be ignored. Further, in high resolution scanning implementations, the lenses used are generally highly corrected in any event and accordingly, the small differences in focus and magnification can be adjusted in ways other than locating the lens at the distance from the first focus point which actually provides the best focus and magnification.

Accordingly, a lens or lens assembly operating at a magnification other than one, can provide two different magnifications while maintaining the upstream and downstream focus points fixed by simply moving the lens between two different positions disposed on the optical axis of the lens. The lens movement longitudinally along the optical axis can be accomplished using any lens support and movement mechanism or assembly as may be suitable for the particular implementation. Additionally or alternatively, the lens movement can, if desired, be performed manually.

It will be further recognized by those skilled in the art that if more than two addressabilities, i.e., resolutions, are required, as is most often the case in modern imagesetting and platesetting systems, and hence more than two different beam spot sizes are required, multiple lenses or lens assemblies can be cascaded to provide more than two magnifications as will be discussed further below such that up to $2^n$ different spot sizes can be obtained with n being the number of cascaded lenses or lens assemblies.

Turning now to FIG. 1, it is known that for some lens of focal length f, and magnification m, there is a second lens position where the magnification is 1/m while the object/image conjugates remain fixed.

$$\frac{1}{s} + \frac{1}{s'} = \frac{1}{f} \tag{1}$$

where s is object distance, i.e., the distance from the lens to an upstream focus point 10, and s' is image distance, i.e., the distance from the lens to the downstream focus point 20, and f is effective focal length of the lens. Accordingly:

$$\begin{aligned} s' &= ms \\ s &= nf \end{aligned} \tag{2}$$

where m is the magnification and n is some multiple which is not necessarily an integer. Hence:

$$f = \frac{ms^2}{s(m+1)} = \frac{mn^2 f^2}{nf(m+1)} = \frac{mnf}{m+1} \rightarrow (n-1) = \frac{1}{m} \tag{3}$$

To find two positions corresponding to imaging resolutions of 3600 and 1800 dots per inch (dpi), there is a magnification change of 2, i.e., (3600/1800), so the lens magnification ratio is:

$$\frac{m}{1/m} = 2. \tag{4}$$

This implies $m^2=2$ and:

$$m_1 = \sqrt{2} = 1.414 \tag{5}$$

Accordingly:

$$m_2 = \frac{1}{m_1} = 0.707 \tag{6}$$

Assuming an effective focal length (EFL) equal to 25 mm then:

$$n = \frac{1}{m_1} + 1 = 1.707 \tag{7}$$

$$s_1 = nf = (1.707)(25) = 42.675 \tag{8}$$

$$s_1' = mnf = 60.342 \tag{9}$$

$$n_2 = \frac{1}{m_2} + 1 = 2.414 \tag{10}$$

$$s_2 = (2.414)25 = 60.35 \tag{11}$$

$$s_2' = 42.667 \tag{12}$$

The above holds true for any two addressabilities.

To cover four addressabilities, two lenses or lens assemblies can be daisy chained. Each one of the four different position combinations would represent one addressability. Hence, to cover 3600 and 2400 dpi addressability, with one lens or lens assembly, a magnification change of 1.5 is required. This implies $m_1=\sqrt{1.5}=1.225$ and $m_2=1/m_1=0.816$.

Referring specifically to FIG. 1, with the lens located at a distance s from focus point 10 and a distance s' from focus point 20, the lens magnification at focus point 20 which, for example, could be an imaging surface, will be m. By relocating the lens to a distance s' from the focus 10 and hence a distance s from the focus point 20, the magnification at the focus point 20 will be 1/m. Accordingly, by simply repositioning a single lens between fixed focus points 10 and 20, the magnification and thus the spot beam size can be modified to correspond to two different addressabilities, i.e., two different resolutions.

Figure 2A:
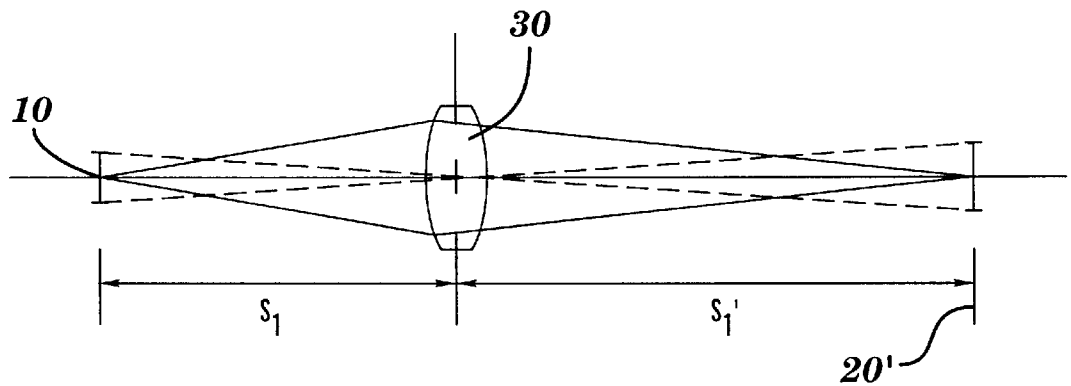
FIG. 2A depicts a lens arrangement with the lens positioned for a selected system addressability having a relatively low resolution in accordance with the present invention.

Turning now to FIG. 2A, a single lens arrangement for providing a relatively large spot size which corresponds to a relatively low image resolution is shown. As depicted, the beam travels from the focus point 10 through the lens 30 which is located in the optical beam path at a distance $s_1$ from the focus point 10 and a distance $s_1'$ from an image plane 20' disposed downstream of the lens 30. With the lens positioned as shown, a relatively large beam spot size will be imaged at the image plane 20' and accordingly, the resolution will be relatively low.

Figure 2B:
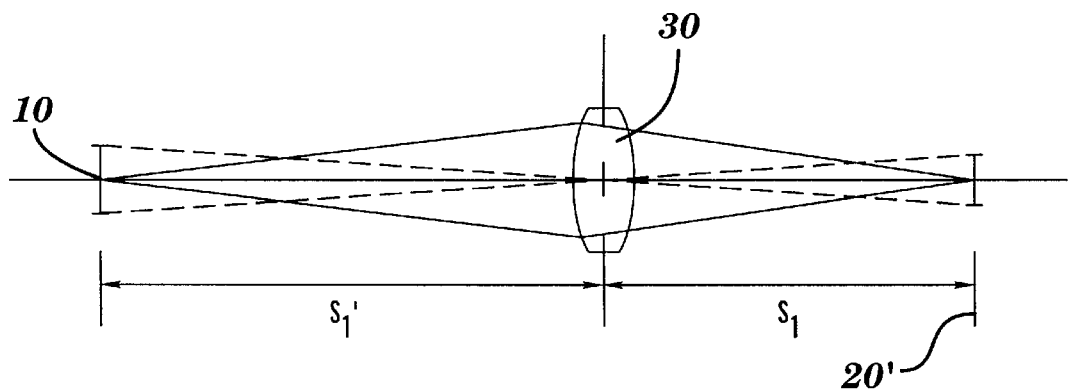
FIG. 2B depicts a lens arrangement similar to that of FIG. 2A but with the lens positioned to correspond to a different system addressability having a relatively higher resolution in accordance with the present invention.

FIG. 2B depicts the lens 30 of FIG. 2A positioned to provide a smaller beam spot size at the image plane 20'. More particularly, the lens 30 in FIG. 2B is repositioned from its location in FIG. 2A to the distance s' from the focus point 10 and hence $s_1$ from the image plane 20' to change the beam spot size at the image plane 20'. The magnification of the lens 30 positioned as shown in FIG. 2B is the reciprocal of the magnification of the lens 30 at the position shown in FIG. 2A. As shown in FIG. 2B, the beam spot size at the image plane 20' is smaller than that of the beam spot at the image plane 20' in FIG. 2A and accordingly corresponds to a higher system resolution.

Figure 3:
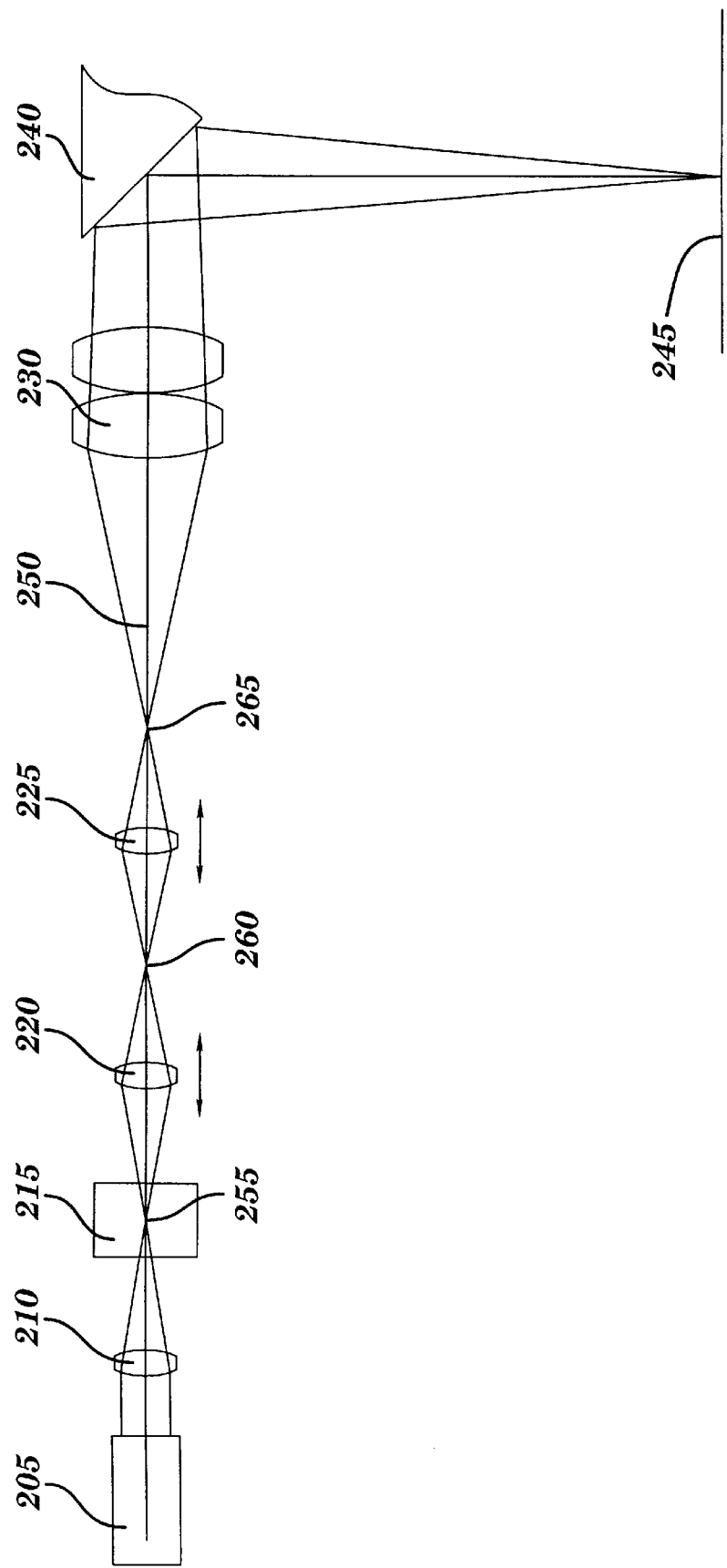
FIG. 3 depicts a multi-lens scan assembly having a gas laser light emitter in accordance with the present invention.

FIG. 3 depicts a scan assembly in accordance with the present invention which is suitable for use in imagesetting and platesetting operations. As shown, the system includes a gas laser light beam source 205 which generates and emits a laser light beam. The beam is directed through the AOM focus lens 210 to an AOM 215 where it is focused at a focus point 255. The beam is then transmitted along its optical path through lenses 220 and 225. The first lens 220 is, as indicated by the two headed arrow, movable longitudinally along its optical axis 250. The first lens 220 focuses the laser light beam at a focus point 260 before the beam passes through the second lens 225. The second lens 225, as also indicated by a dual headed arrow, is likewise movable longitudinally along its optical axis 250. The first and second lenses 220, 225 are depicted in exact alignment and accordingly, both move along a single optical axis 250. As will be discussed further below, any misalignment in the optical axes of the lenses can, in accordance with other aspects of the invention, be adjusted. The second lens 225 focuses the laser light beam at a focus point 265 prior to the beam passing through the final focus lens 230 and onto the spin mirror 240 which directs the focused light beam onto the image plane 245 to read or write an image.

Figure 4:
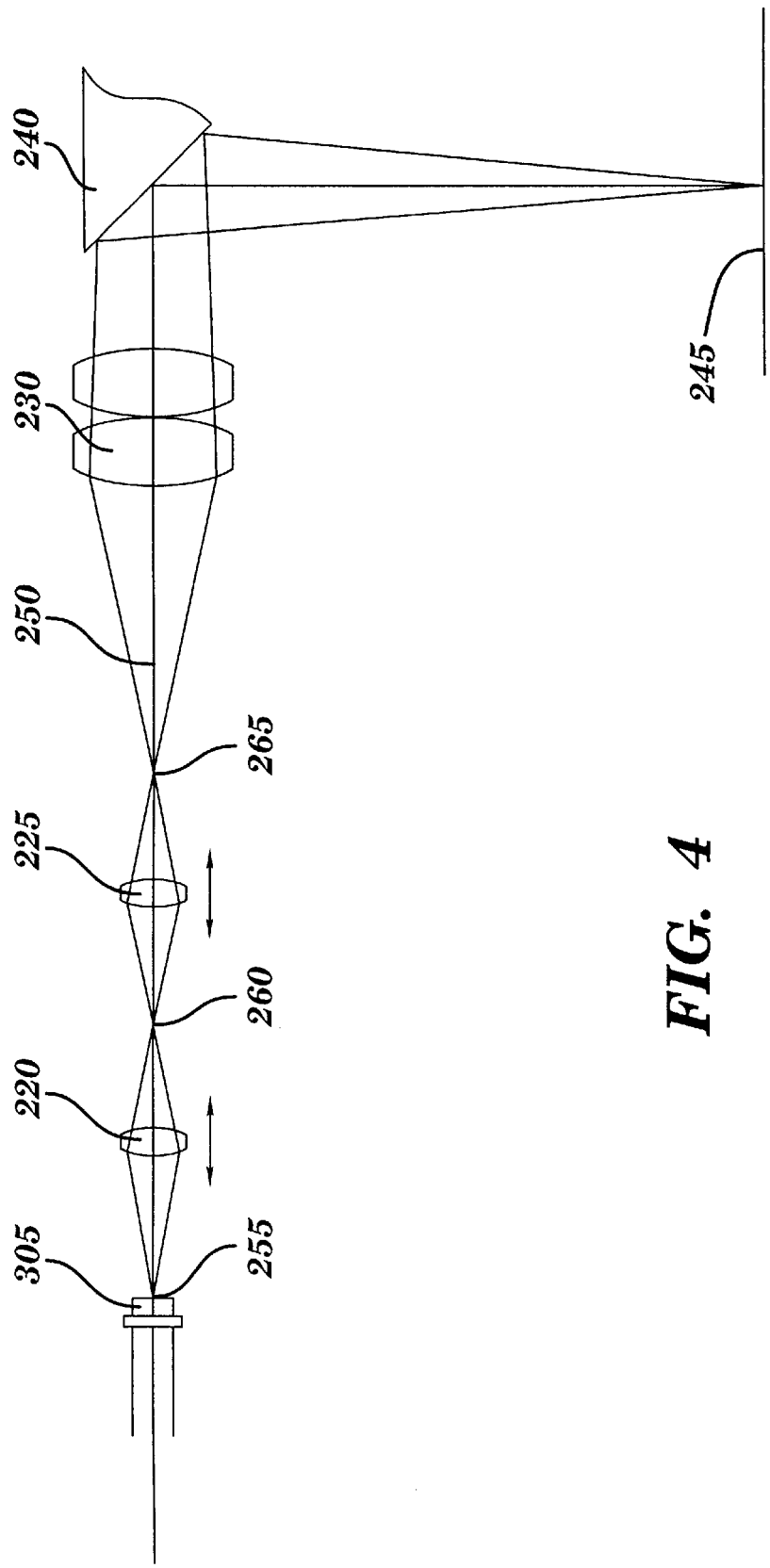
FIG. 4 depicts a multi-lens scan assembly having a laser diode emitter in accordance with the present invention.

FIG. 4 depicts a scan assembly which is identical to that depicted in FIG. 3, except that the gas laser light source 205, AOM focus lens 210 and AOM 215 of FIG. 3 have been replaced by a laser diode 305 which generates and emits a focussed laser light beam along a path through the lenses 220 and 225.

Figure 9:
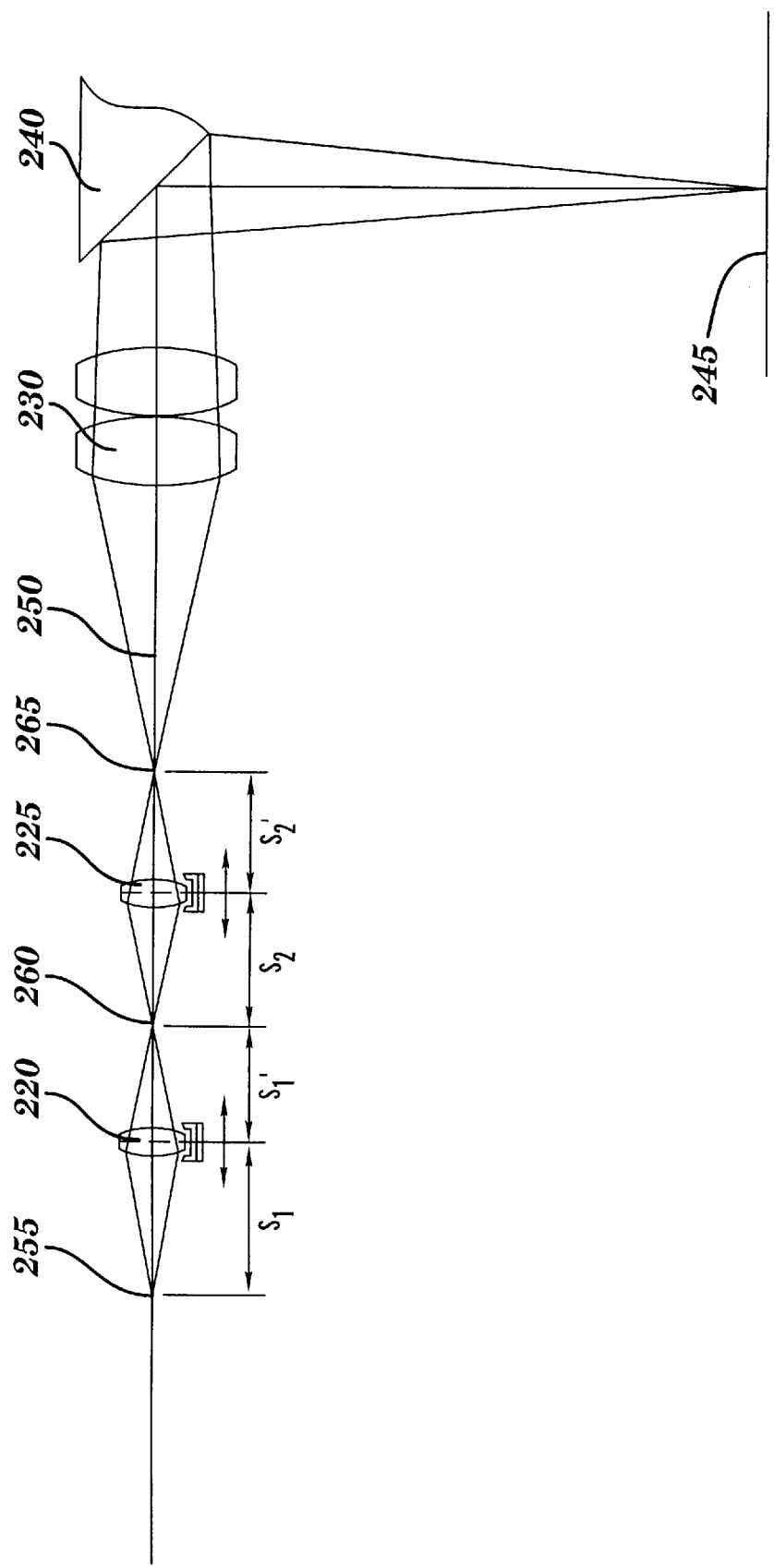
FIG. 9 details the positioning of the lenses depicted in FIGS. 5, 6 and 7 at one position in accordance with the present invention.

Referring now to FIG. 9, the location of the first lens 220 and second lens 225 with respect to the focus points 255, 260 and 265 as shown in FIGS. 3 and 4 is indicated for a selected system addressability. Hence, the FIG. 9 lens arrangement provides a particular resolution at the image plane 245. As shown in FIG. 9, the first lens 220 is located at a distance $s_1$ from the focus point 255 and $s_1'$ from the focus point 260. The second lens 255, which may have an effective focal length either the same or different than the effective focal length of the first lens 220, is located at a distance $s_2$ from the focus point 260 and $s_2'$ from the focus point 265.

As discussed with reference to FIG. 1, and as will be described further below, to change the dot size at the image plane 245 to correspond with a different system addressability and hence to provide a different scanning resolution, either or both of the first and second lenses can be moved along the optical axis 250 to a second position. For example, the first lens 220 can be repositioned so as to be a distance $s_1'$ from the focus point 255 and a distance $s_1$ from the focus point 260 to change the spot size at the image plane 245 and hence the system resolution. Alternatively or additionally, the second lens 225 can be repositioned to a distance of $s_2'$ from the focus point 260 and $s_2$ to the focus point 265 to provide still another spot beam size at the image plane 245 and hence additional system addressability.

Although the dimensions $s_1$, $s_1'$, $s_2$ and $s_2'$ are shown from the center line of the applicable lens, this is not necessarily the case and the dimensioning could be from an outer surface of the lens or lens assembly, or from a suitable plane or planes within the lens or lens assembly, as will be clearly recognized and understood by one skilled in the art.

Figure 5:
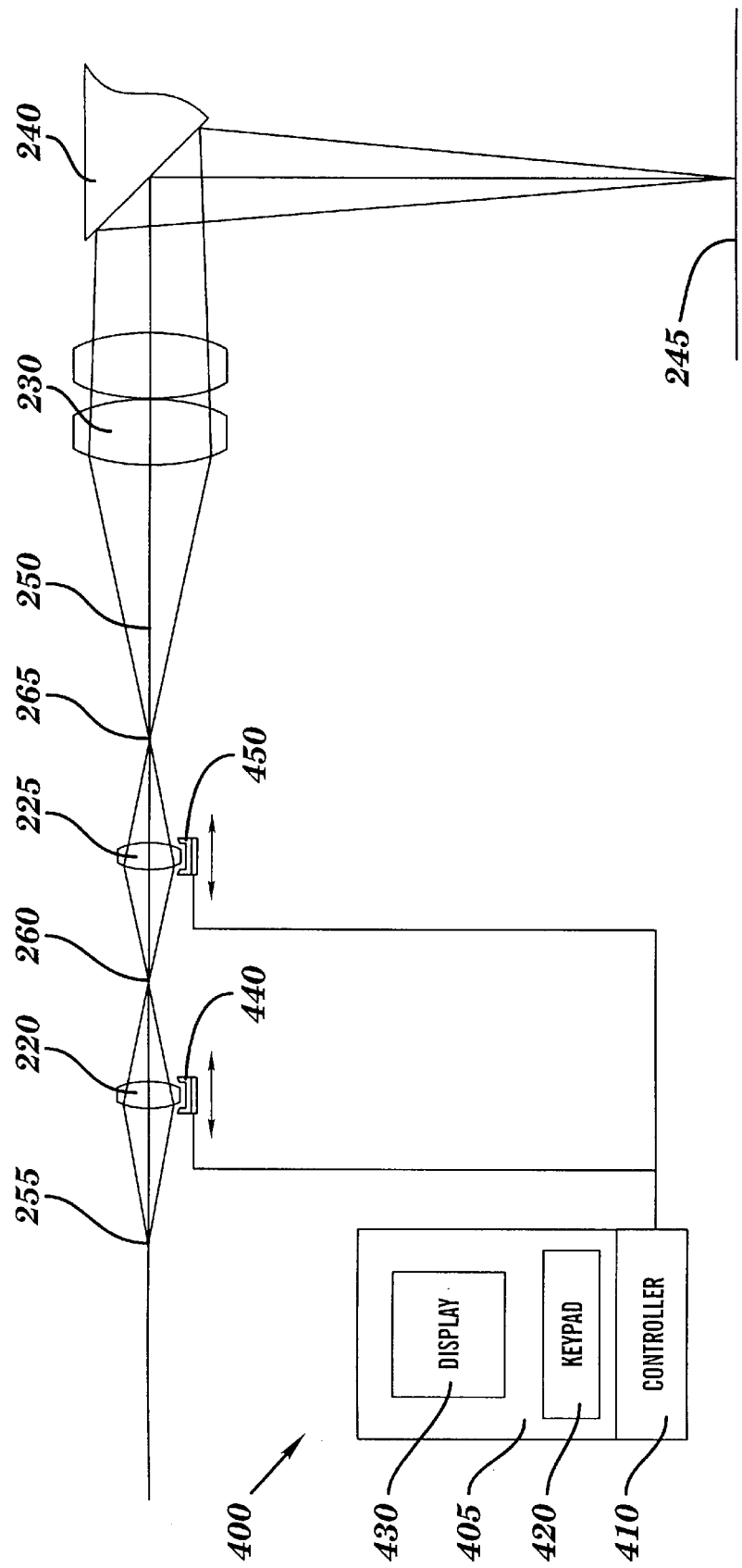
FIG. 5 depicts a multi-lens scanning system including a controller in accordance with the present invention.

Referring now to FIG. 5, preferably a control system 400 having a control panel 405, a keypad 420 or other device for accepting operator inputs either via direct local entry or a communications link, a display 430 for visually conveying inputted or other information to the imagesetting or platesetting system operator and a controller 410 for controlling the lens drive assemblies 440 and 450 is provided. In operation, the imagesetter or platesetter operator selects one of four addressabilities which are obtainable with the two lens scan assembly of FIG. 5. The input signals are transmitted to the controller 410 which directs the display 430 to display the selected addressability and perhaps other information corresponding thereto.

The controller also issues signals to one or both of the lens drive assemblies 440 or 450 to move one or both of the first and second lenses 220 and 225 to their necessary positioning to provide a spot beam size at the image plane 245 corresponding to the selected addressability. The controller may store data corresponding to a current location of each of the drive assemblies 440 and 450 and hence the lenses 220 and 225. If this is the case, the controller may, prior to generating and transmitting signals to the lens assemblies 440 and 450, first determine if the present lens positioning is appropriate for the selected addressability.

To obtain high quality imaging, the beam spot positioning at the image plane 245 will be the same notwithstanding the selected system addressability. That is, the movement of the lenses 220 and 225 to change the beam spot size should not affect the location where the beam impinges upon the image plane 245. However, in practical imagesetting and platesetting implementations, the movement of one or both of the lenses 220 and 225 may result in some misalignment of the light beam at the image plane 245.

Figure 6:
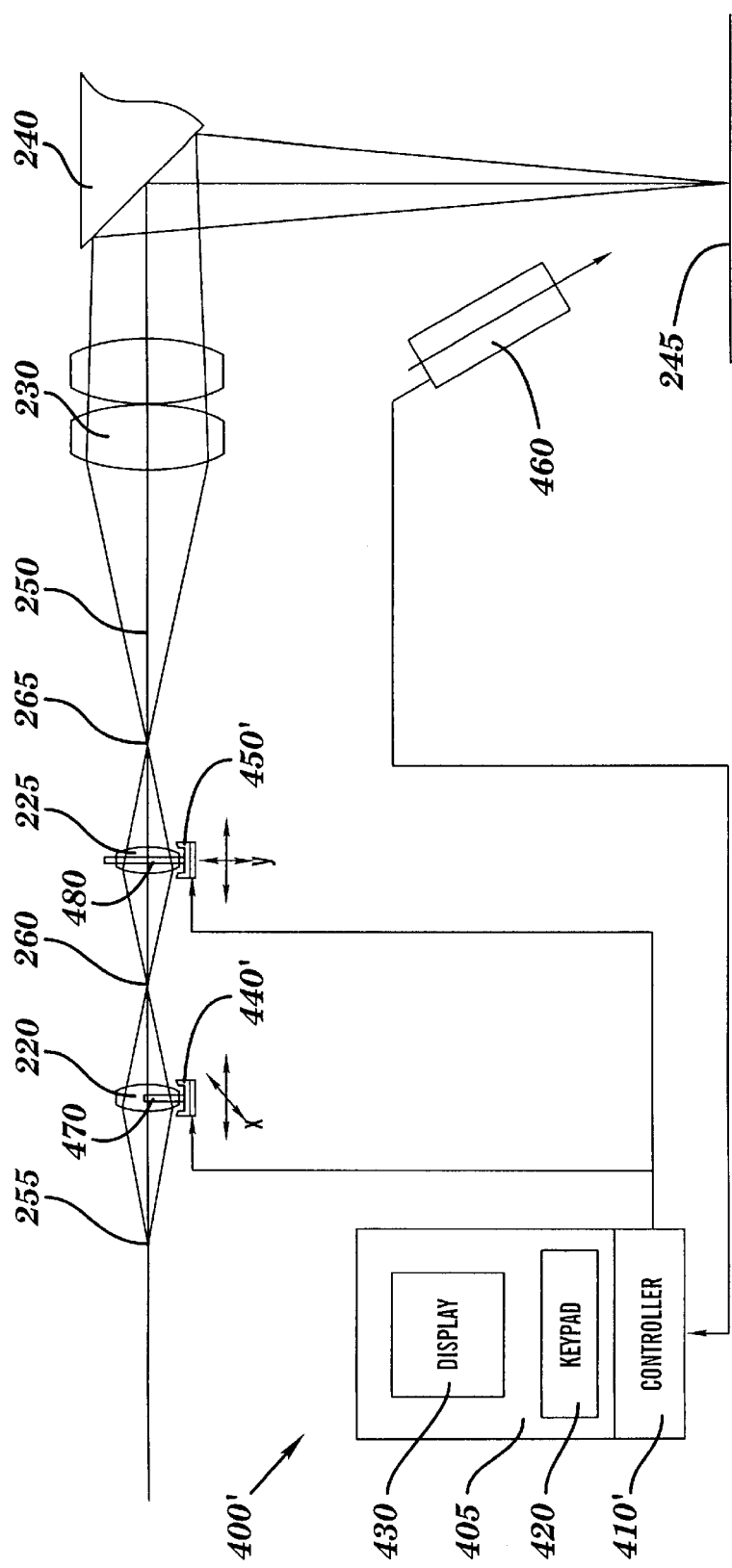
FIG. 6 depicts a multi-lens scanning system including a controller and closed loop monitoring system with multi-lens alignment adjustment in accordance with the present invention.

FIG. 6 depicts a scanning system having a control and closed loop monitoring system which includes a sensing device and beam spot position adjustment assemblies. Components shown in FIG. 6 which are identical to those described previously are referenced with identical reference numerals. These components will, in general, not be further described to avoid unnecessary duplication. The control system 400' includes a controller 410' which is interconnected to a sensor 460 for detecting the positioning of the spot beam on the image plane 245.

The sensor 460 may be a real time sensor which continually monitors the spot beam position and feeds representative signals to the controller 410' or may be operable only if so instructed by the controller 410' in accordance with an operator input entered via the keypad 420. For example, the sensor may, if desired, be operated to only detect the present positioning of a beam spot responsive to an operator input changing the addressability of the system and then the positioning of a spot beam immediately after the lenses 220 and/or 225 have been repositioned to provide the desired resolution.

In either case, the sensor 460 detects the positioning of a beam spot on the image plane 245 before and after movement of one or both of the lenses 220 and 225 to change the beam spot size at the image plane 245. The sensor transmits signals representing the detected beam spot positioning to the controller 410'. The controller 410' processes the signals received from the sensor 460 to determine if the spot beam impinging upon the image plane 245 after the image resolution and hence beam spot size at the image plane 245 has been changed is identical to the position of the beam spot at the image plane 245 prior to the change in resolution or within a required alignment tolerance. If the alignment is determined by the controller 410' to be acceptable, no further action need be taken. However, if the controller 410' determines that an unacceptable misalignment exists, the controller 410' is configured to issue signals, responsive to which the x lens movement assembly 470 and/or y lens movement assembly 480 moves the lens 220 in a horizontal direction x, which is shown to be in and out of the drawing, and/or moves lens 225 vertically in the y direction. It will be noted that both the x and y movements are substantially perpendicular to the optical axis of the respective lenses. The lateral movement of the lenses 220 and/or 225 by the x and y lens movement assemblies 470 and 480 will, as is well understood in the art, reposition the light beam impinging upon the image plane 245 and thereby correct the detected misalignment.

Figure 7:
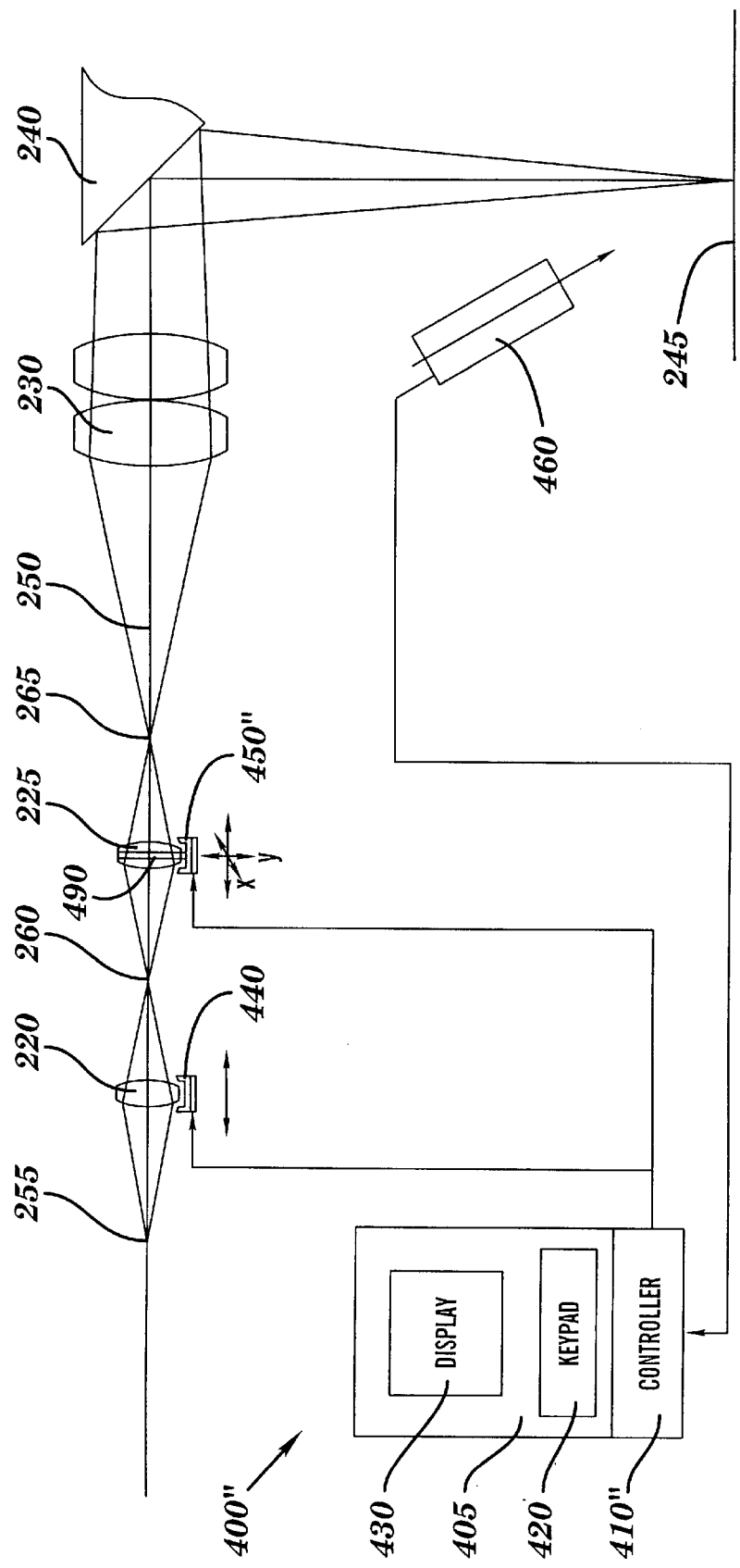
FIG. 7 depicts a multi-lens scanning system having a controller and closed loop monitoring system with single lens alignment adjustment in accordance with the present invention.

Referring now to FIG. 7, a control system 400" is provided which is interconnected to an x-y lens movement assembly 490 of the lens drive assembly 450". The system depicted in FIG. 7 is similar to that depicted in FIGS. 5 and 6 and identical components are referenced with identical reference numerals and will in general not be further described. The primary difference between the FIG. 6 and FIG. 7 configurations is that in the FIG. 7 configuration the controller 410", rather than controlling the lateral movement of both the first and second lenses 220 and 225 to correct any unacceptable misalignment, corrects any misalignment error by moving only a single lens 225 by controlling a single x-y lens movement assembly 490 to move the lens substantially perpendicular to the lens 225 optical axis 250 to correct the detected misalignment of the beam spot at the image plane 245.

Figure 8:
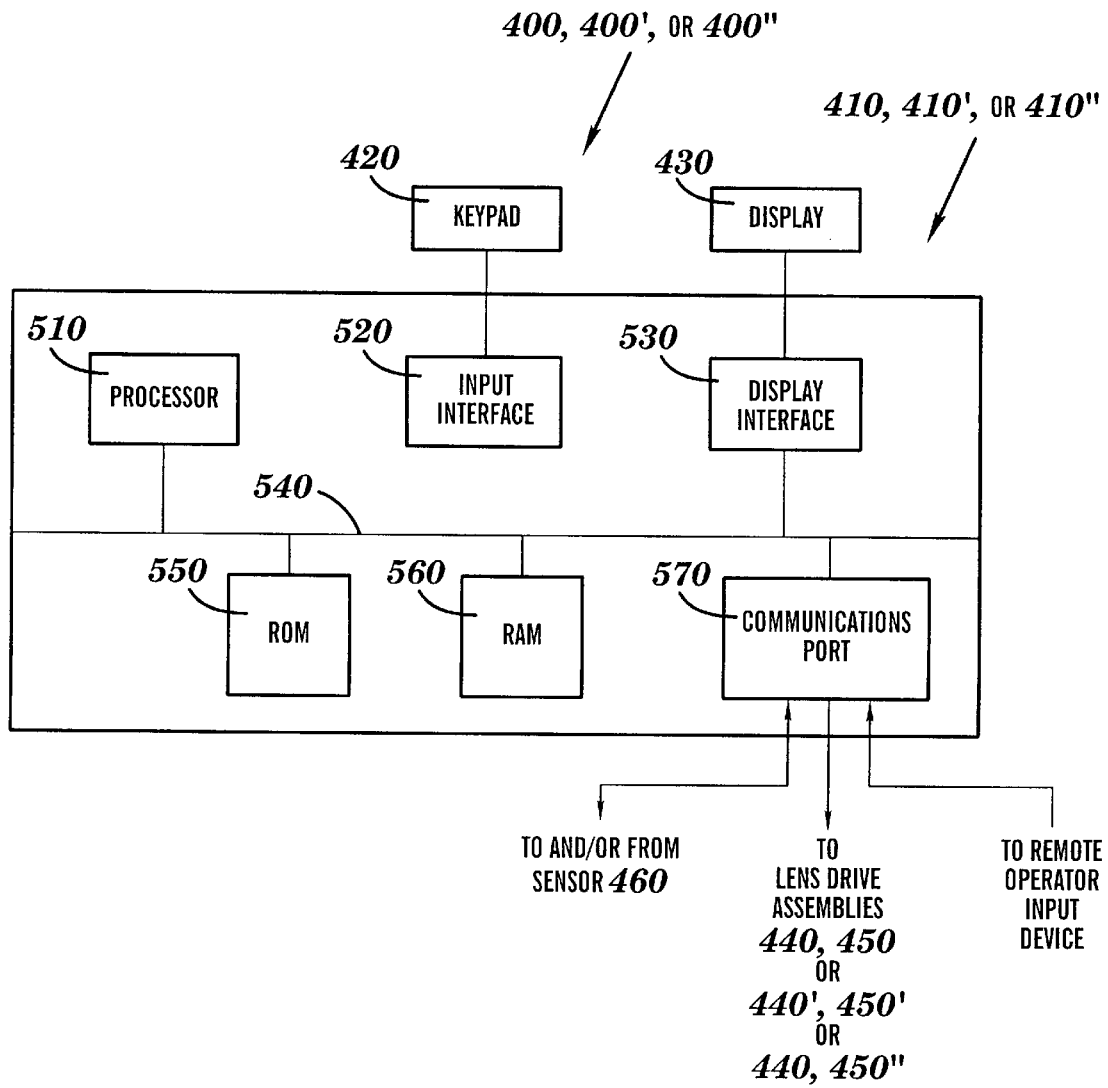
FIG. 8 depicts a simplified block drawing of the control systems depicted in FIGS. 5, 6, and 7.

FIG. 8 shows a somewhat simplified depiction of the control systems 400, 400' and 400". As shown in FIG. 8, the controller 410, 410' and 410" includes a digital processor 510 which could, for example, be a Pentium™ processor. Any commercially available keypad 420, mouse (not shown) or other input device could be utilized. The display 430 is a commercially available monitor. Preferably, the control systems 400, 400' and 400" are assembled from commercially available hardware components. The uniqueness of the controller 410, 410' and 410" resides in the software instructions which are stored on its read only memory (ROM) 550.

In addition to the processor 510 and ROM 550, the controller 410, 410', 410" includes a communication port for communicating with the lens drive assemblies 440, 450 or 440', 450' or 440, 450", as the case may be, and the sensor 460, if applicable. The communications to the lens drive assemblies include those communications necessary to direct the lens movement assemblies 470, 480 and 490 to move one or both lenses laterally. An input interface 520 provides an interface to the keypad 420 and a display interface 530 provides an interface to the display 430. A random access memory (RAM) 560 is provided to temporarily store data which will be utilized by the processor 510 in accordance with the applicable controller's programmed instructions. A bus 540 conveys signals between the various sub-components within the controller in the customary fashion. It will be recognized that the development of the programming instructions stored on the ROM 550 to instruct the processor 510 to operate as described herein is a matter of routine programming efforts which will be easily accomplished by one skilled in the art without undue effort.

The operation of the control system depicted in FIG. 8 will be described with reference to the FIG. 7 configuration. The control system will, of course, operate in a somewhat modified manner in the systems of FIGS. 5 and 6 described above, as will be understood by one skilled in the art. An imagesetter or platesetter operator enters a selected system addressability on the keypad 420 which is transmitted via the input interface 520 and bus 540 to the processor 510. The processor 510 in accordance with the programmed instructions stored on the ROM 550, which may be transferred to the RAM 560 during control operations, generates signals which are transmitted via the bus 540 and a communications port 570 to one or both of the lens drive assemblies 440 and 450". In accordance with the signals received from the controller 410", one or both of the lens drive assemblies 440 and 450" move one or both lenses 220 and 225 laterally along the optical axis 250 to modify the beam spot size at the image plane 245 to correspond with the selected addressability.

The sensor 460, either continuously or responsive to an instruction from processor 510 received via the bus 540 and port 570 after a system addressability change, detects the beam spot positioning on the imaging plane 245 both before and after the spot size change, and transmits signals representing the positions of the spot beam at the image plane 245 both before and after the change in the spot size to the controller 410". The signals are received by the communications port 570 and transmitted to the processor 510 via the bus 540. The processor in accordance with its stored programmed instructions, processes the signals from the sensor 460 to determine if the position of the beam spot after the size change is suitably aligned with the beam spot before the size change.

If not, the controller 410", in accordance with its stored programmed instructions, generates a signal to the lens drive assembly 450" directing the x-y lens movement assembly 490 to laterally displace the second lens 225 perpendicular to optical axis 250 to move the current beam spot into alignment with the beam spot prior to the change in the beam spot size. The position of the beam spot at the imaging surface 245 prior to the size change will typically be stored for a short period on the RAM 560 by the processor 570 in accordance with the stored programming instructions. As noted above, if desired, the sensor 460 and controller 410" may be utilized to continually monitor and adjust, as necessary, any detected misalignments in the spot beam positioning at the image plane 245. Alternatively, the sensing and adjustment may be performed only initially during diagnostic testing of a newly installed or newly repaired imagesetter or platesetter and during beam spot size changes.

Referring now to FIGS. 10A–10D, first and second complex lens assemblies 220' and 225' are cascaded with a final focus lens assembly 230' along a beam path as shown. As indicated, each of the respective figures depicts lens positioning to provide a different resolution and hence system addressability.

Figure 10A:
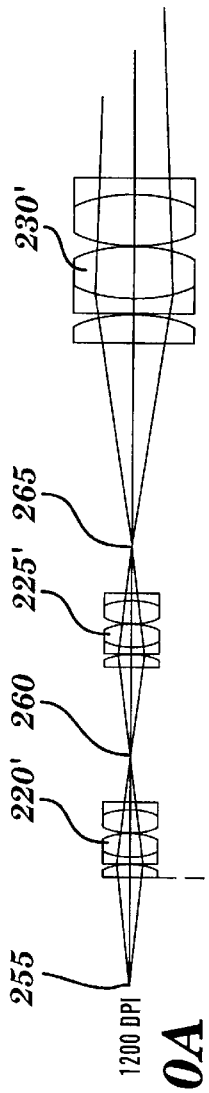
FIG. 10A depicts a lens arrangement including multiple movable lens assemblies positioned for a particular system addressability in accordance with the present invention.
Figure 10B:
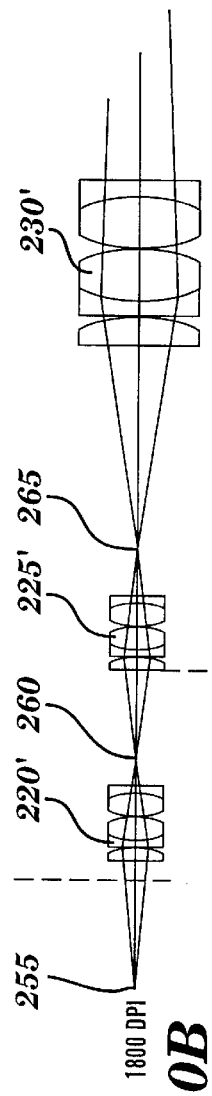
FIG. 10B depicts a lens arrangement similar to that of FIG. 20A with the lens assemblies positioned to correspond with a second system addressability.
Figure 10C:
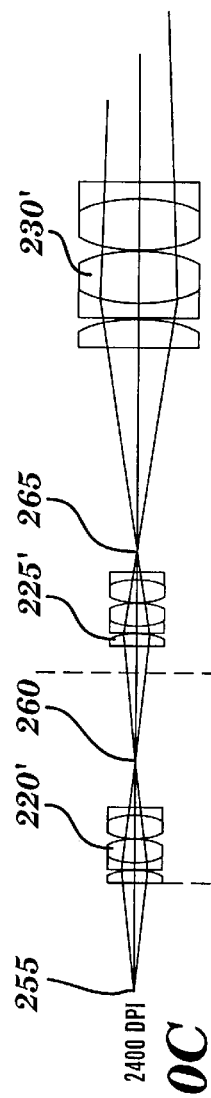
FIG. 10C depicts a lens arrangement similar to that depicted in FIGS. 10A and 10B with the lens assemblies arranged to correspond to still another system addressability.
Figure 10D:
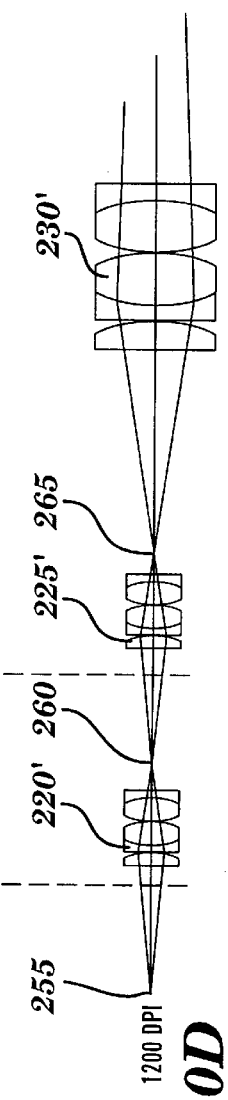
FIG. 10D depicts a lens arrangement similar to that depicted in FIGS. 10A–10C with the lens assemblies positioned to correspond to yet another system addressability.

In the particular exemplary implementation shown, FIG. 10A will provide 1200 dpi resolution, FIG. 10B will provide 1800 dpi resolution, FIG. 10C will provide 2400 dpi resolution and FIG. 10D will provide 3600 dpi resolution. As indicated in FIGS. 10A–10D, beginning with the lens assemblies positioned as shown in FIG. 10A, the lens 220' can be moved in a manner previously discussed, while leaving lens assembly 225' in an unchanged location, to change the spot size at the imaging surface from that corresponding to a 1200 dpi resolution to a smaller size corresponding to an 1800 dpi resolution. By retaining the first lens assembly 220' in the same location as required to develop a beam spot size corresponding to a 1200 dpi resolution and moving the lens assembly 225' as indicated in FIG. 10C, the beam spot size at the imaging surface can be made to correspond to a 2400 dpi resolution. By moving both the lens assemblies 220' and 225' as indicated in FIG. 10D from their positions in FIG. 10A, the spot size developed at the imaging plane will correspond to 3600 dpi resolution. Accordingly, as shown, by using a two lens or lens assembly arrangement, four different beam spot sizes each corresponding to a different system addressability and resolution can be developed at the imaging surface.

Figure 11:
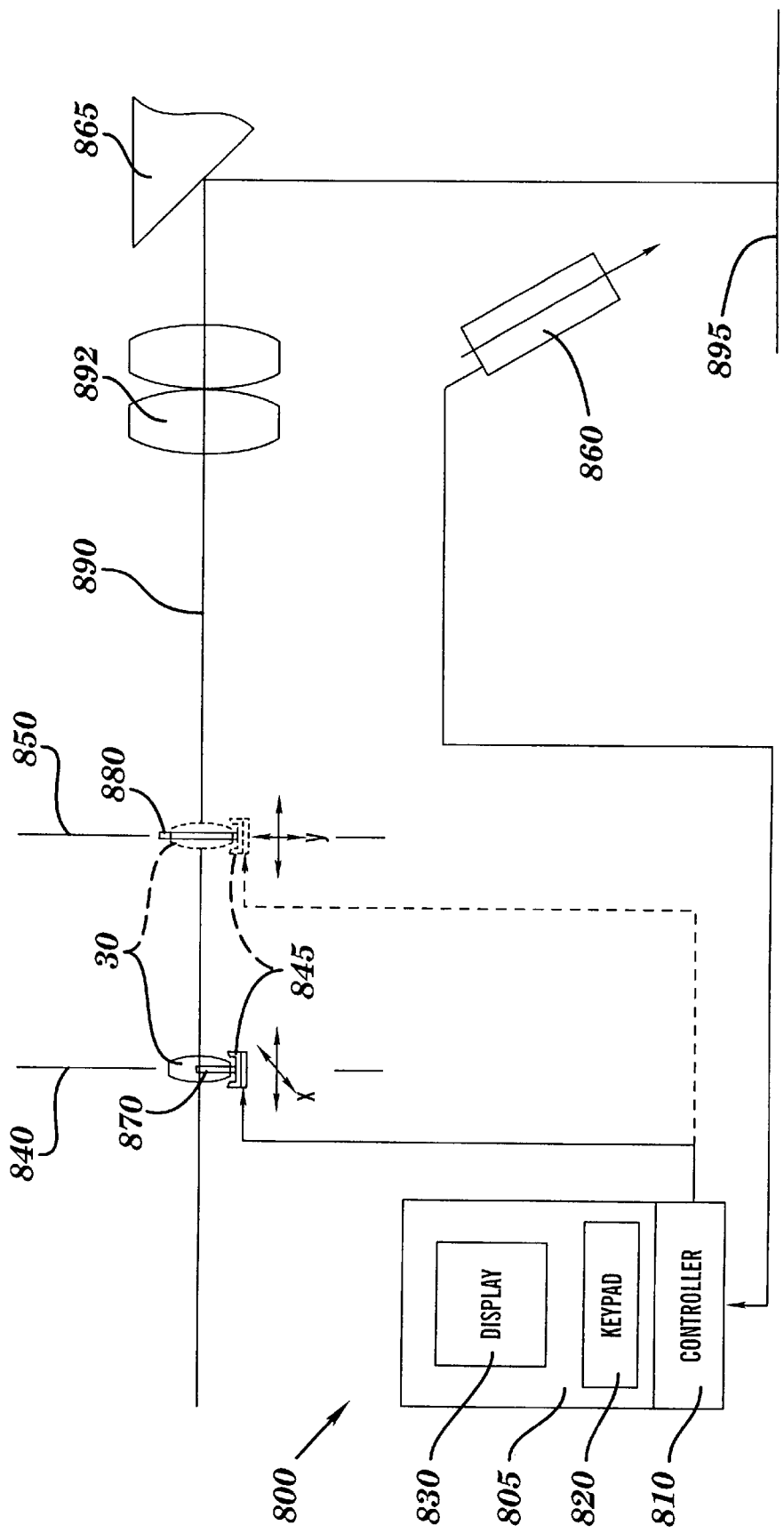
FIG. 11 depicts a single lens scanning system including a controller with single lens alignment adjustment in accordance with the present invention.

FIG. 11 depicts still other aspects of the present invention. In this embodiment, the single lens or lens assembly 30 is moved from a first position 840 to a second position 850 to change the spot beam size at the image plane 895, as has been previously described. As shown, the lens 30 and final focus lens 892 have a common optical axis. The optical beam is directed through the lens 30 and final focus lens 892 so as to be reflected by S the spin mirror 865 onto the image plane 895.

The lens 30 is supported by a lens drive assembly 845 which is controlled by the control system 800 to move the lens from the first position 840 to the second position 850 and vice-versa, depending upon the desired resolution entered on the keypad 820, or remotely transmitted via a communications link, to the controller 810 of the control system 800. As shown, the control system 800 has a control panel 805, a keypad 820 or other input device, a display 830 and a controller 810 for controlling the lens drive assembly 845 so as to move the lens responsive to the inputted resolution.

As discussed above to obtain high quality imaging, the beam spot positioning at the image plane 895 is preferably the same notwithstanding the selected system addressability. Since, the movement of the lens 30 may result in some misalignment of the light beam at the image plane 895, x and y lens movement set assemblies 870 and 880 are provided. As shown, these assemblies 870 and 880 are not mounted to the lens drive assembly 845 but rather are mounted so as to remain stationary with respect to the movement of the lens 30.

The x lens movement set assembly 870 is a mechanical adjustment assembly for setting the adjustment of the lens 30 only in the x direction and only with the lens in the first position 840. The y lens movement set assembly 880 is also a mechanical adjustment assembly for setting the adjustment of the lens 30 only in the y direction and only with a lens 30 in the second position 850. Because lens 30 is adjusted in only one of respective orthogonal directions at each position, the adjustment of the lens position perpendicular to the optical axis 890 in each of the two lens positions 840, 850 is less complex and alignment of the beam spots at the image plane 895 is simplified.

To adjust the position of the lens 30 in the x and y positions using the set assemblies 870 and 880, a sensor 860 is provided and interconnected to the controller 810 of the control system 800. The sensor 860 may be a test sensor which is temporarily mounted to the system and connected to the controller during factory testing of the imagesetting or platesetting system or during acceptance testing of the system during initial installation. Accordingly, the sensor 860 is utilized only temporarily and operated responsive to specific instructions entered on the keypad 820 during testing at the manufacturing plant or installation facility.

The sensor 860 senses the position of the spot beam at the image plane 895 with the lens 30 in the first position 840 and the second position 850, and communicates the sensed data to the controller 810. The controller, in accordance with its programmed instructions, determines if the positioning of the spot beams on the image plane 895 with the lens 30 located in the first and second positions 840, 850 are aligned along the x-axis and y-axis at the image plane 895. If not, the misalignment is indicated on the display 830. The operator enters the first resolution on the keypad 820 responsive to which the controller 810 signals the lens drive assembly 845 to place the lens in the first position 840. The lens is moved in the x direction by manually adjusting the x lens movement set assembly 870 such that the spot beam is moved into a desired x-axis location at the image plane 895 so that the beam spots will be aligned along the x-axis.

The second resolution is next entered via the keypad 820, responsive to which the controller 810 signals the lens drive assembly 845 to move the lens 30 to the second position 850. The sensor 860 may again be used to detect the changed position of the spot beam on the image plane 895 and feed the corresponding data to the controller 810, although this is not mandatory. If a misalignment exists in the y-axis positioning of the spot beam at the image plane 895 with the lens 30 in the second position 850, the lens 30 is moved in the y direction by manually adjusting the y lens movement set assembly 880 with the lens in the second position 850 to properly align the beam spots in the y direction. The alignment can be checked, if desired, by sensing the beam spot with the lens at the first and second positions, and again processing the sensed data in controller 810 to confirm acceptable alignment of the spot beams. The x and y lens movement set assemblies are then locked in their adjusted positions and the sensor removed from the imagesetter or platesetter.

It will be recognized by those skilled in the art that a permanent sensor could be substituted for the temporary sensor 860 and the controller programmed, as discussed above with reference to FIGS. 6 and 7, to provide on-line sensing and automatic close loop x and y directional movement of the lens 30 to eliminate any misalignment of the spot beams at the image plane 895. However, utilizing the implementation depicted in FIG. 11 provides an uncomplicated and low cost way to obtain spot beam alignment adjustment either during factory testing or initial installation and eliminates the need for a real time alignment sensor in the imagesetting or platesetting system.

Figure 12:
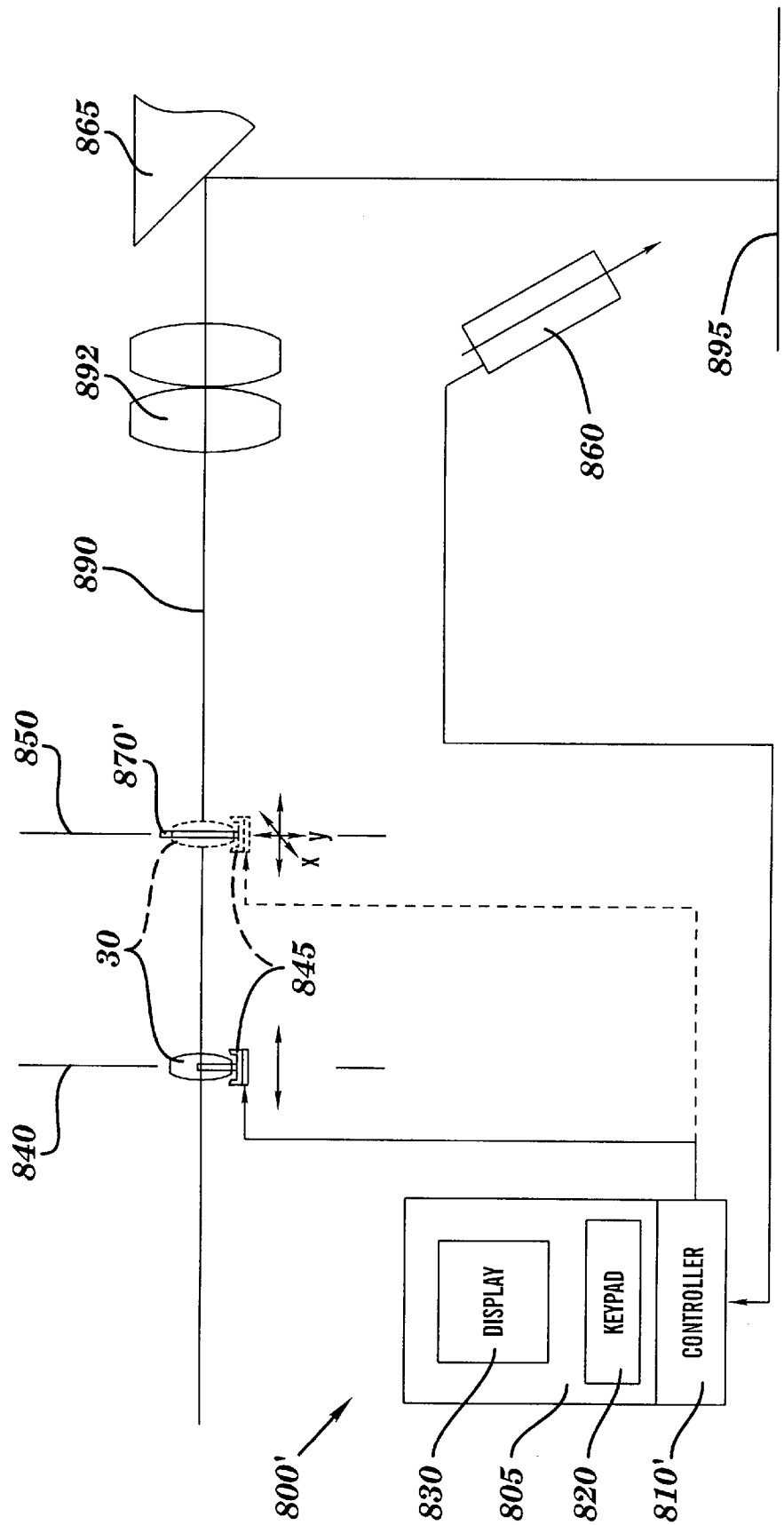
FIG. 12 depicts another embodiment of a single lens scanning system having a controller with single lens alignment adjustment in accordance with the present invention.

FIG. 12 is similar to FIG. 11 and like elements are referenced with identical reference numerals. In FIG. 12, an x-y lens movement set assembly 870' is substituted for the respective x lens movement set assembly 870 and y lens movement set assembly 880 of FIG. 11. The x-y lens movement set assembly 870' is separated from the lens drive assembly 845 and remains stationary with respect to the movement of the lens 30 between the first position 840 and second position 850.

In the FIG. 12 implementation, the temporary sensor 860 provides data to the controller representing the positioning of the spot beams at the image plane 895 with the lens 30 in the first and second positions 840, 850. The data is processed by the controller 810' in accordance with its programmed instructions, to determine if a misalignment exists between the spot beam positioning with the lens in the first and second positions. If so, the controller 810' drives the display 830 to display information indicative of the extent of adjustment required in the x direction and y direction.

The x-y lens movement set assembly 870' is manually operated with the lens 30 only in the first or second positions 840, 850 to adjust the lens 30 in both the x and y directions perpendicular to the optical axis 890 so as to obtain proper alignment of the spot beams at the image plane 895. The alignment can, if desired, be checked using the sensor 860 before the adjustment mechanisms of the set assembly 870' are locked and the sensor 860 removed, as has been previously discussed.

Those skilled in the art will recognize that any number of different lens movement set assemblies can be used to move the lens 30 in the manner described above. It will also be recognized that the lens movement assemblies depicted in FIGS. 6 and 7 could be substituted for the lens movement set assemblies described with reference to FIGS. 11 and 12, and vice versa, if so desired. Those skilled in the art will also clearly understand how to adapt the lens movement set assemblies described in FIGS. 11 and 12 to a multi-lens type system. Additionally, it will be recognized that, if desired, the implementations described with reference to FIGS. 11 and 12 could include a real time sensor as part of a closed loop for automatically and continuously monitoring and adjusting the lens to eliminate any spot beam misalignments during the systems operations. It should be understood that the control systems 800 and 800' will be similar to the control systems depicted in FIG. 8.

As described above, optical beam spots of different sizes and substantially equal power can be developed on an imaging surface by simply moving one or more lenses and without the need for multiple apertures or zoom lens arrangements. Each of the developed beam spot sizes is related to a predefined and selectable system addressability. As described, multi-resolution systems are provided which are easily constructed, aligned and focused and offer high optical efficiency with a minimum number of optical components.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. An article of manufacture for forming optical beam spots of different sizes on an imaging surface, comprising:
    computer readable storage medium; and
    computer programming stored on said storage medium;
    wherein said stored computer programming is configured to be readable from said computer readable storage medium by a computer and thereby cause said computer to operate so as to:
        process an operator input signal to thereby identify a selected one of a first imaging resolution and a second imaging resolution;
        generate a signal representing the identified one of the first and the second imaging resolutions, to direct movement of a lens, having a single fixed magnification other than one and being disposed in an optical path of an optical beam which impinges upon the imaging surface and is focussed at a first focus point upstream of the lens to, if the first imaging resolution is identified, a first position located a first distance from the first focus point and a second distance from a second focus point of the optical beam which is downstream of the lens to thereby form a beam spot of a first size on the imaging surface and, if the second imaging resolution is identified, to a second position located the second distance from the first focus point and the first distance from the second focus point to thereby form a beam spot of a second size, which is different than the first spot size, on the imaging surface.

2. An article of manufacture according to claim 1, wherein said stored computer programming is configured to be readable from said computer readable storage medium by the computer to thereby cause said computer to operate so as to:
    process first signals representing a first location of the beam spot on the imaging surface before moving the lens and second signals representing a second location of the beam spot on the imaging surface after moving the lens to identify a misalignment of the first and the second locations; and
    if a misalignment is identified, generate a signal to direct movement of the lens in a direction substantially perpendicular to an optical axis of the lens and thereby corrects the identified misalignment.

3. An article of manufacture according to claim 1, wherein:
    the lens has an effective focal length;
    the first distance is substantially equal to the effective focal length multiplied by 1.707 and the second distance is substantially equal to the effective focal length multiplied by 2.414.

4. An article of manufacture according to claim 1, wherein the lens is a first lens and said stored computer programming is configured to be readable from said computer readable storage medium by the computer to thereby cause said computer to operate so as to:
    process an operator input signal to thereby identify a selected one of a third imaging resolution and a fourth imaging resolution, wherein each of the first, the second, the third and the fourth imaging resolutions is different;
    generate a signal representing the identified one of the third and the fourth imaging resolutions, to direct movement of a second lens, having a single fixed magnification other than one and being disposed in the optical path of the optical beam downstream of the second focus point, to, if the third imaging resolution is identified, a third position located a third distance from the second focus point and a fourth distance from a third focus point of the optical beam which is downstream of the second lens to thereby form a beam spot of a third size on the imaging surface and, if the fourth imaging resolution is identified, a fourth position located the fourth distance from the second focus point and the third distance from the third focus point to thereby form a beam spot of a fourth size on the imaging surface, wherein each of the first, the second, the third and the fourth beam spot sizes is different.

5. An article of manufacture according to claim 4, wherein with the first lens at the first position and the second lens at the third position the optical beam forms a beam spot of the first size on the imaging surface, with the first lens at the second position and the second lens at the third position the optical beam forms a beam spot of the second size on the imaging surface, with the first lens at the first position and the second lens at the fourth position the optical beam forms a beam spot of a third size on the imaging surface, with the first lens at the second position and the second lens at the fourth position the optical beam forms a beam spot of a fourth size on the imaging surface.

6. An article of manufacture according to claim 4, wherein the first lens is moved along its optical axis and the second lens is moved along its optical axis, and said stored computer programming is configured to be readable from said computer readable storage medium by the computer to thereby cause said computer to operate so as to:

process a first signal representing a first location of the beam spot on the imaging surface before changing the beam spot size and a second signal representing a second location of the beam spot on the imaging surface after changing the beam spot size to identify a misalignment of the first and the second locations; and if a misalignment is identified, generate a signal to direct movement of at least one of the first and the second lenses such that the at least one lens moves in a direction substantially perpendicular to its optical axis and thereby corrects the identified misalignment.

7. An article of manufacture according to claim 6, wherein the substantially perpendicular direction is one of a horizontal direction and a vertical direction.

8. An article of manufacture according to claim 6, wherein the substantially perpendicular direction includes a horizontal component and a vertical component.

9. An article of manufacture according to claim 6, wherein the first lens moves in one of a horizontal and a vertical direction and the second lens moves in the other of the horizontal and the vertical direction.

10. An article of manufacture according to claim 6, wherein:

the first lens has a first effective focal length and the second lens has a second effective focal length;

the first distance is substantially equal to the first effective focal length multiplied by 1.707 and the second distance is substantially equal to the first effective focal length multiplied by 2.414; and the third distance is substantially equal to the second effective focal length multiplied by 1.707 and the fourth distance is substantially equal to the second effective focal length multiplied by 2.414.

11. An article of manufacture according to claim 10, wherein the first effective focal length is different than the second effective focal length.

* * * * *